Figure 1:
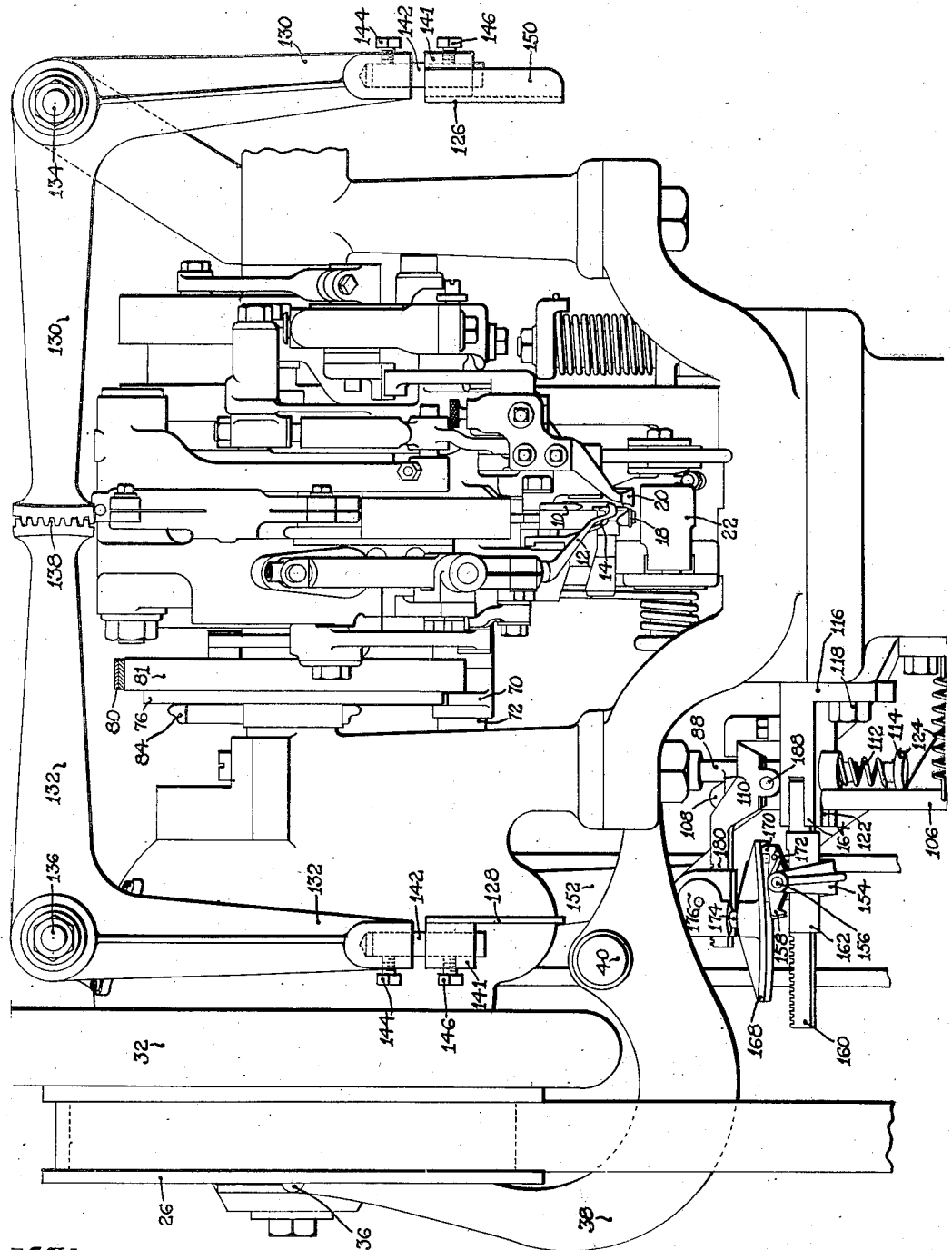

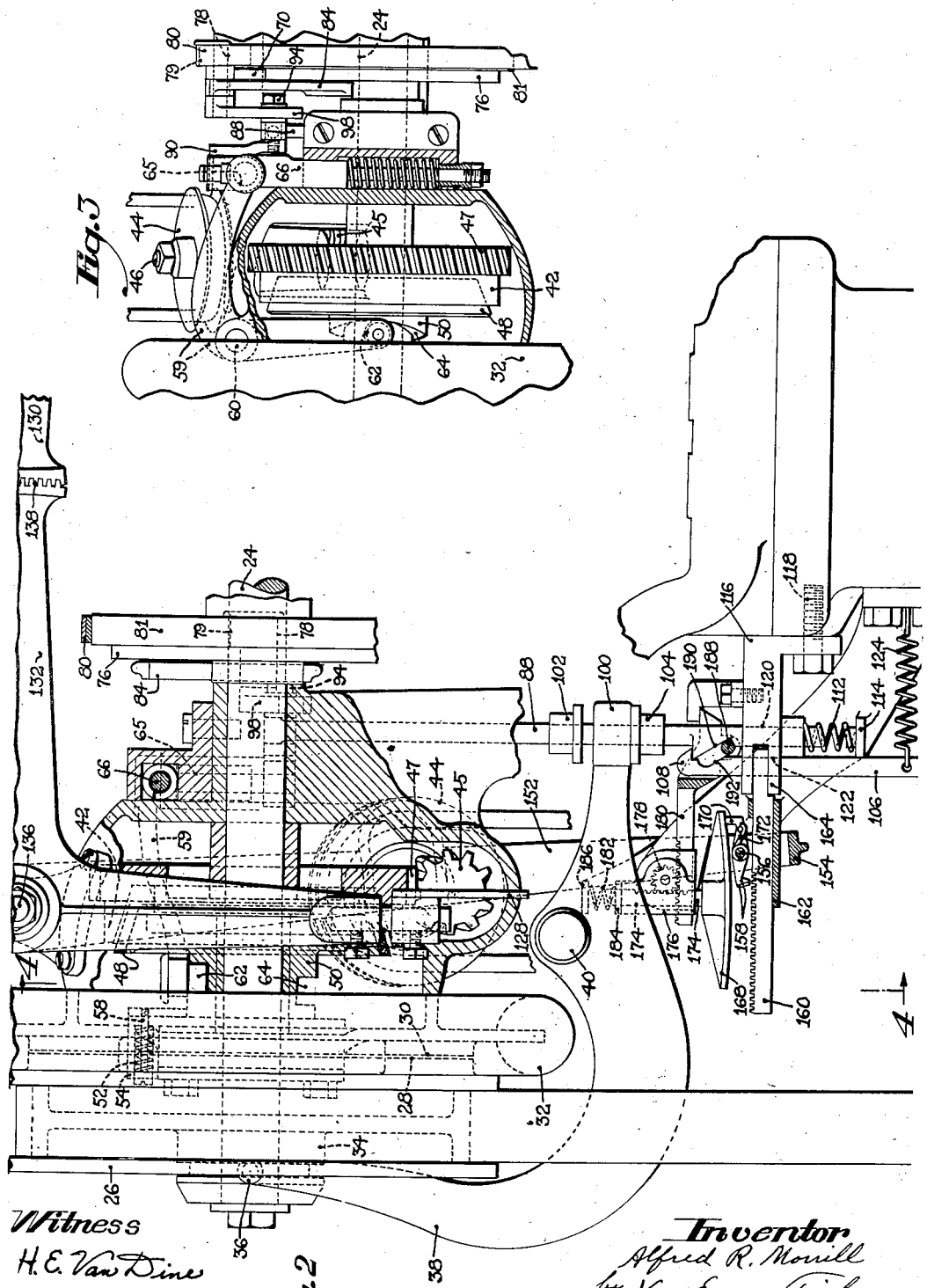

June 4, 1935.    A. R. MORRILL    2,003,512
MACHINE FOR USE IN THE MANUFACTURE OF SHOES
Filed Nov. 30, 1932    6 Sheets-Sheet 3

Witness
H. E. Van Dine

Inventor
Alfred R. Morrill
by Van Everen Fish
Hildreth Neary Attys

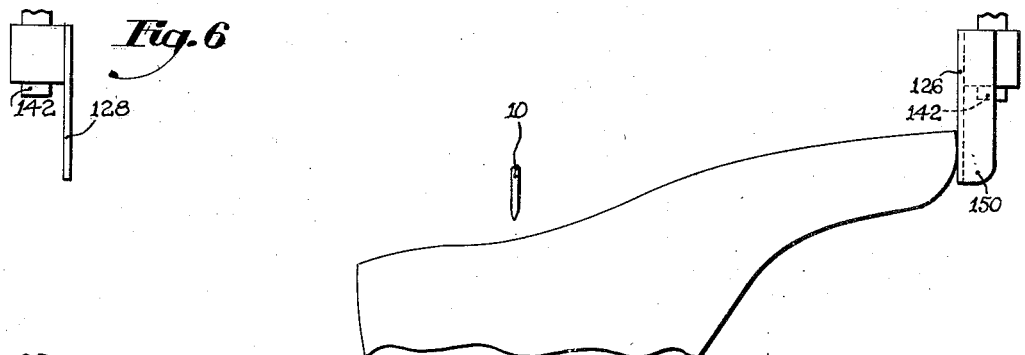
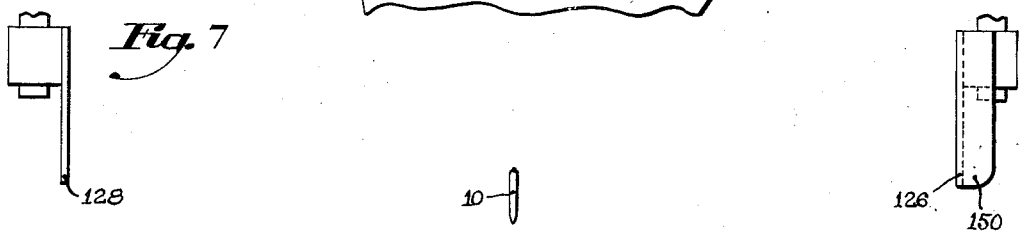
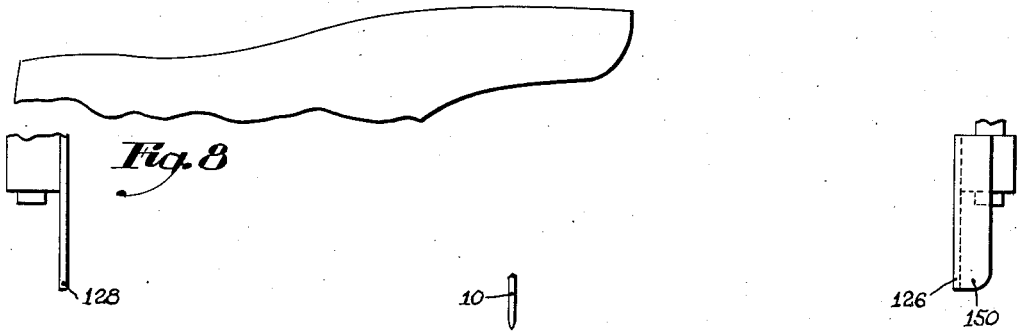
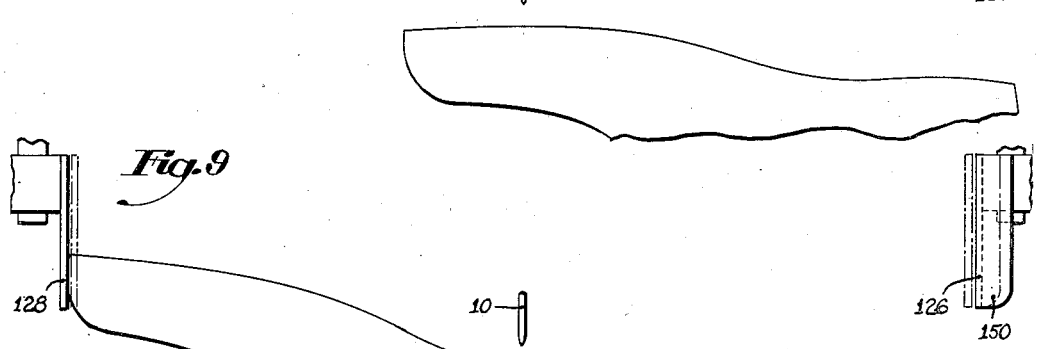

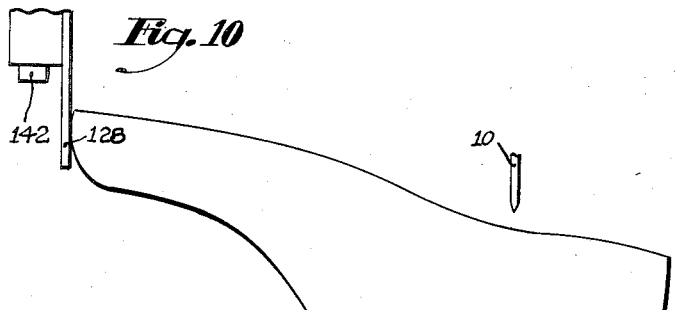
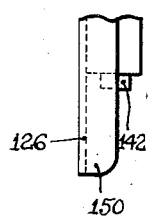
Fig.10
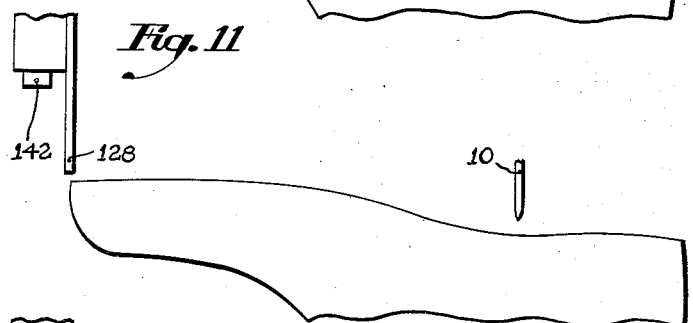
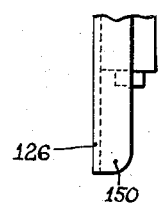
Fig.11
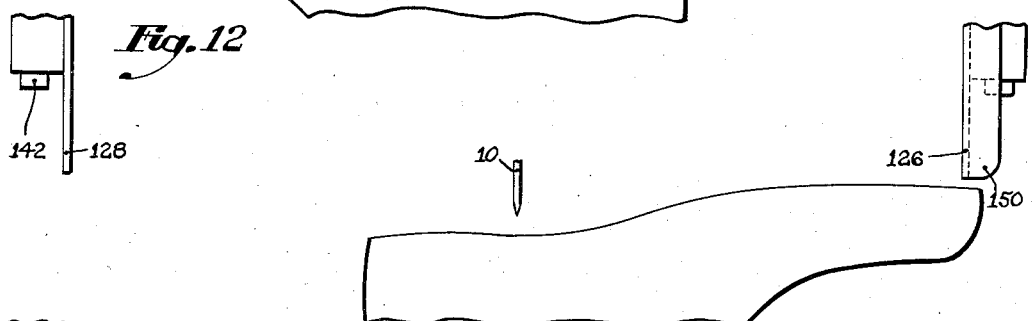
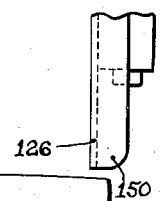
Fig.12
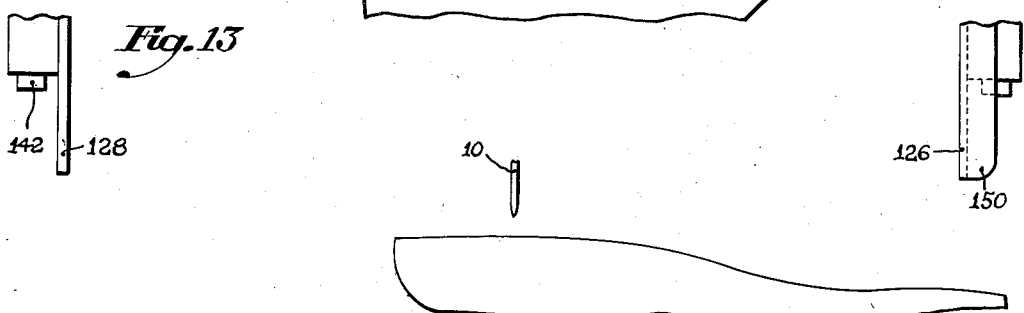
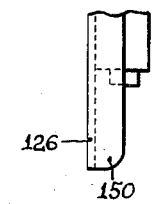
Fig.13
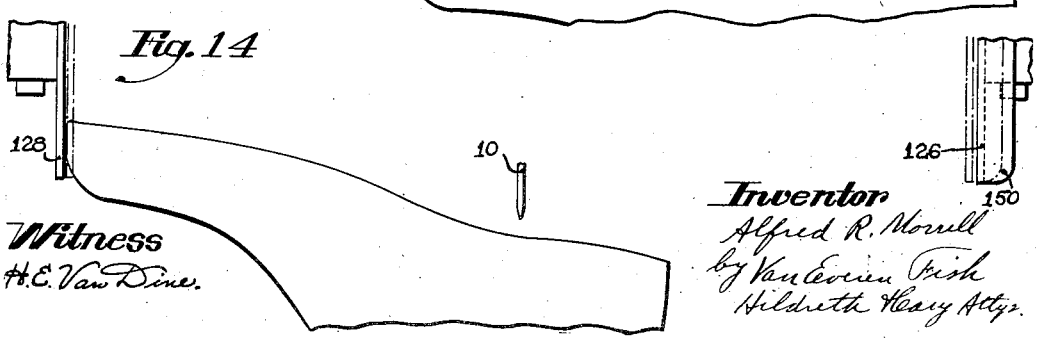
Fig.14

June 4, 1935.                    A. R. MORRILL                    2,003,512
                   MACHINE FOR USE IN THE MANUFACTURE OF SHOES
                   Filed Nov. 30, 1932           6 Sheets-Sheet 6
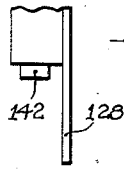
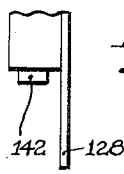
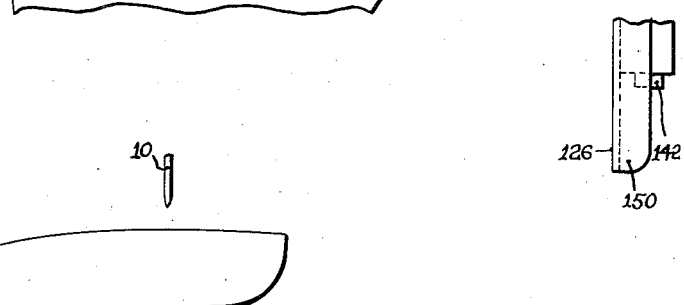
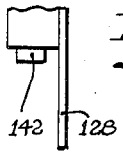
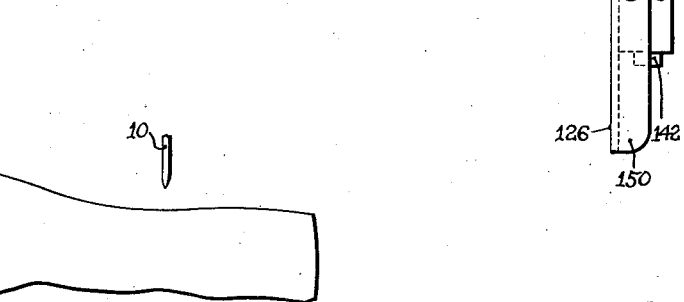
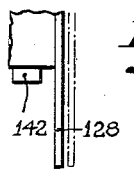
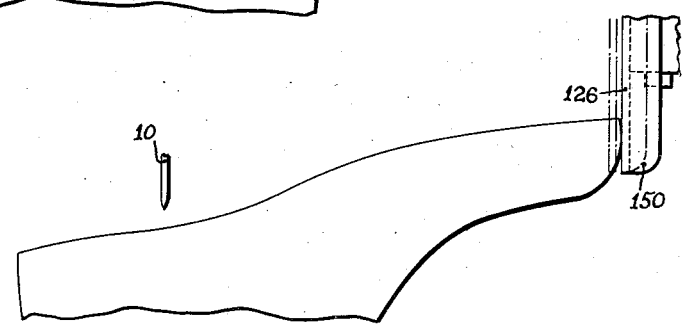
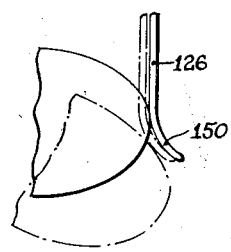
Witness
H. E. Van Dine.
Inventor
Alfred R. Morrill
by Van Everen Fish
Hildreth Hery Attys Patented June 4, 1935

2,003,512

UNITED STATES PATENT OFFICE 2,003,512

MACHINE FOR USE IN THE MANUFACTURE OF SHOES

Alfred R. Morrill, Beverly, Mass., assignor to United Shoe Machinery Corporation, Paterson, N. J., a corporation of New Jersey Application November 30, 1932, Serial No. 645,019

21 Claims. (Cl. 112—219)

The present invention relates to a machine for operating on shoes, and more particularly to the provision in a shoe machine of a control mechanism which is rendered operative by contact with the shoe to automatically control the operation of the machine in the performance of such of its various functions as may be expedient or desirable.

The present invention is herein disclosed as embodied in an inseam sewing machine for sewing together the welt, upper and insole of a welt shoe, such, for instance, as that disclosed in the patent to Eppler No. 1,108,560, dated August 25, 1914.

In embodying the present invention in this machine, a shoe contacting control mechanism is provided which is well adapted for use in that class of work in which the sewing operation extends from the breast line of the heel on one side of the shoe around the toe to the breast line of the heel on the other side of the shoe with a resulting rotation of the shoe with relation to the sewing instrumentalities through substantially 180°, and also for that class of work in which the sewing operation extends entirely around a shoe sole from the starting point, causing the shoe to be turned a complete revolution with relation to the sewing instrumentalities. It will be clearly understood, however, that the several features of the invention while particularly well adapted for use in a machine of this description, are not to be limited to this type of machine, or specifically to a sewing operation, but are equally applicable to any machine for operating on shoes in which the operating point is carried progressively around the edge or margin of the shoe sole.

A main object of the present invention is to provide, in a machine in which the shoe is held in the hand of the operator, novel and improved mechanism controlled from the shoe which is well adapted to perform automatically certain operations usually controlled by the operator as the point of operation progresses about the shoe, and more particularly in stopping the machine at the end of the operation on the shoe.

More specifically, it is an object of the present invention to provide mechanism which is automatically adjusted by contact with the shoe when the shoe is placed in the machine, and is actuated by contact with the shoe at the end of the operation on the shoe to stop the machine.

With these and other objects in view as may hereinafter appear, a principal feature of the invention consists in the provision of a shoe contact member and mechanism cooperating therewith rendered operative by engagement of the shoe with the member at the end of the operation on the shoe to perform the required functions in completing the operation on the shoe.

Another feature of the present invention consists in the provision of one or more shoe engaging members and mechanism cooperating therewith rendered operative by contact with the shoe to maintain said member or members in a position determined in accordance with the size of the shoe upon placing the shoe in the machine, and thereafter upon further movement of the member or members by contact with the shoe at the end of the operation, to stop the machine.

Another feature of the present invention consists in the provision of two shoe engaging levers positioned one at each side of the sewing point and inter-connected to cause said levers to be maintained at equal distances from the sewing point, while permitting movement thereof simultaneously toward and away from the shoe.

Figure 4:
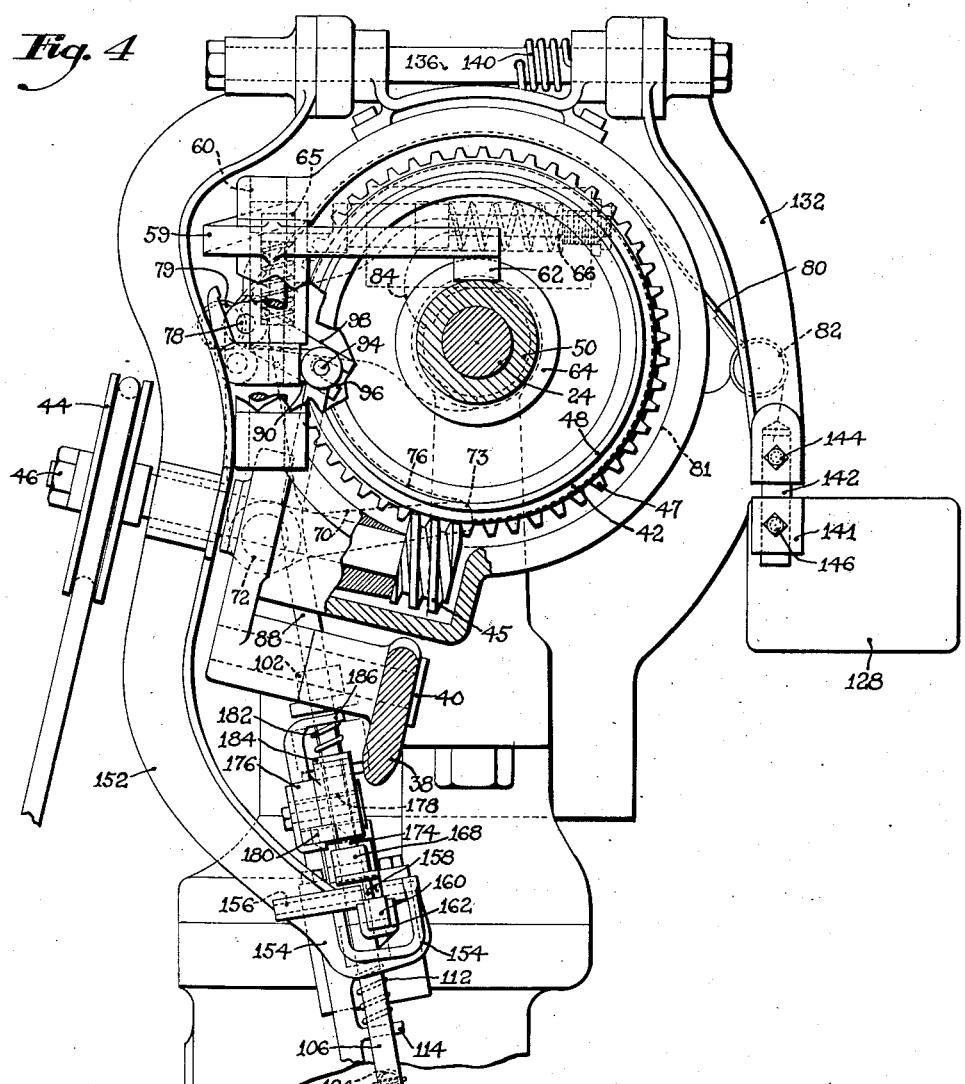
Figure 5:
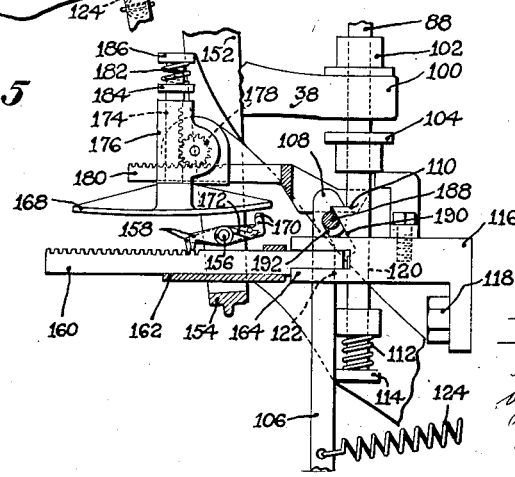

The several features of the invention consist also in the devices, combinations and arrangement of parts hereinafter described and claimed, which together with the advantages to be obtained thereby, will be readily understood by one skilled in the art from the following description when taken in connection with the accompanying drawings, in which Fig. 1 is a view in front elevation of the head of an inseam sewing machine illustrating the application of the present invention thereto; Fig. 2 is a view in front elevation partly in section and with parts broken away to show particularly a stopping mechanism for the machine; Fig. 3 is a detail plan view with parts broken away to illustrate portions of the stopping mechanism; Fig. 4 is a view in left side elevation of substantially the parts shown in Fig. 2 taken on the line 4—4 of Fig. 2; Fig. 5 is a detail view on an enlarged scale partly in section of the control mechanism illustrated in Fig. 1 for throwing the stop motion of the machine into operation.

Figs. 6 to 9 inclusive are a series of somewhat diagrammatic views in side elevation showing different positions taken by a shoe with relation to the shoe contact members during the operation of sewing the welt from breast line to breast line of the heel around the toe of the shoe; Figs. 10 to 14 inclusive are a series of somewhat diagrammatic view in side elevation showing different positions taken by a right shoe with relation to the shoe contact members during the sewing of a welt completely around the shoe starting at the inside breast line of the heel; Figs. 15 to 18 inclusive are a series of somewhat diagrammatic views in side elevation showing the several positions taken by a left shoe with relation to the shoe contact members during the operation of sewing a welt completely around the shoe; and Fig. 19 is a plan view of the toe of the shoe as shown in Fig. 18, the parts in their full line position showing the stop position of the shoe contact member.

The machine illustrated in the drawings, is provided with a curved hook needle 10, a looper 12, a thread arm 14, a take-up and an auxiliary take-up, a chnanel guide 18, a welt guide 20, and a back rest 22, these parts having the same construction and mode of operation as those in the machine of the Eppler patent above referred to. As in the patent above referred to, the sewing and work feeding instrumentalities are operated from a horizontal cam shaft indicated at 24 in the head of the machine.

The machine is driven from an outside source of power by means of a belt pulley 26 which is loosely sleeved to turn on the cam shaft 24 and is connected thereto to drive the machine through a two speed driving and stopping mechanism which is similar in its general construction and mode of operation to that shown in the patents to Topham No. 1,099,328, dated June 9, 1914, and Ashworth No. 1,519,652, dated December 16, 1924. As best shown in Fig. 2 of the drawings, this mechanism comprises two cooperating clutch members 28 and 30 mounted respectively on the pulley 26 and on a fly wheel 32 arranged to rotate with the cam shaft 24. In order to provide means for engaging and dis-engaging the clutch members, the pulley 26 is mounted for endwise movement on the shaft, and carries a sleeve hub 34 grooved to receive two rolls 36 mounted on the forked upper end of a clutch actuating lever 38 which is arranged to turn on a pivot 40 fixedly secured to the machine frame.

As in the machines described in the above-mentioned patents, mechanism is provided which is rendered operative when the main clutch members 28 and 30 are disengaged in stopping the machine to gradually retard and reverse the direction of drive, and thereafter to stop the machine in a predetermined angular position with the needle withdrawn from the work.

This mechanism comprises an auxiliary slow speed driving cone clutch member 42 (see Figs. 2, 3 and 4) which is sleeved to turn on the cam shaft 24 and is continuously driven in a reverse direction from a low speed driving pulley 44 through connections which include a shaft 46 to which the pulley is secured, a worm 45 on the shaft, and a spiral gear 47 meshing therewith formed on the outer periphery of the clutch member 42. A cooperating clutch member 48 is carried on a sleeve 50 which is keyed to rotate with and is slidable lengthwise of the cam shaft 24. A compression spring 52 seated in a recess 54 in the flywheel 32 and arranged to act on a pin 58 secured to the sleeve 50 and extending within the recess tends to hold the clutch member 48 out of engagement with the driving clutch member 42.

Upon the disengagement of the main driving clutch members 28 and 30 in stopping the machine, the clutch member 48 is moved into frictional contact with the reversely driven clutch member 42 to gradually retard and reverse the direction of drive of the machine through connections which comprise a bell-crank cam lever 59 mounted to turn on a pivot shaft 60, and provided at one end with a cam roll 62 which engages with the cam groove 64 in the sleeve 50, and provided at its other end with an aperture to receive a vertically movable locking bolt or pin 65 carried by a spring-pressed locking bolt carrier 66 arranged to slide in a horizontal plane in the machine. During the normal operation of the machine, the pin 65 is held in retracted position out of engagement with the cam lever 59, so that the lever can swing idly without affecting the position of the clutch sleeve 50. In stopping the machine the locking bolt 65 is released, causing the locking bolt to engage in the aperture to lock the cam lever 59 against further movement. The continued rotation of the cam shaft 24 and the sleeve 50 then causes the sleeve to be advanced against the pressure of its spring 52 to engage the clutch and reverse the direction of drive. During this reverse rotation the engagement of the cam roll 62 on the bell-crank 59 with the cam groove 64 causes the sleeve 50 and clutch member 48 to be moved to the left as shown in Fig. 2 to disengage the slow speed or auxiliary clutch. The machine is stopped in a predetermined angular position by means of a braking and locking mechanism which comprises a bell-crank locking lever 70 (see Fig. 4) pivoted at 72 on the machine frame and having a horizontal arm arranged to engage a shoulder 73 on a disk 76 secured to the cam shaft 24. An upwardly extending arm of the bell-crank locking lever 70 has journalled therein a rock shaft 78 having at one end an offset crank pin 79 to which is secured a friction brake band 80 which extends over a portion of the periphery of a brake disk 81 and is secured at its other end at 82 on the machine frame. The locking lever 70 is moved about its pivot to swing its horizontal arm into locking position, and also to exert the tension upon the brake upon reversal of the drive by means of an actuating lever 84 pivotally secured to the upper end of the locking lever 70 and provided with two segmental surfaces, the upper one of which runs against a sleeve on the cam shaft 24 during the forward rotation of the cam shaft. When the rotation of the cam shaft is reversed, the notch in the sleeve acts on the lever 84 and rocks it into the position indicated in dotted lines in Fig. 4, thus causing the horizontal arm of the locking lever 70 to enter the slot to engage the shoulder 73 and positively stop the machine.

These parts and their operating connections are similar to those described and illustrated in the patent to Topham above referred to, and are controlled in a similar manner through a vertical control rod 88. The control rod 88 is connected at its upper end to a laterally extending lever arm 90 which is pivoted on the lock bolt carrier 66, and is connected intermediate its length to the lower end of the lock bolt or pin 65, so that the position of the lock bolt 65 is controlled by the position of the control rod 88. The vertical movements of the control rod 88 are also utilized to position the rock shaft 78 to bring the brake band 80 into operating position through connections comprising a pin 94 secured to the upper end of the control rod 88 and arranged to engage in a slot 96 formed in an arm 98 secured to turn with the rock shaft 78 and crank pin 79. In order to control the movement of the main clutch actuating lever 38, the control bar 88 is arranged to extend through a collar 100 formed in the free end of the lever 38, and is provided with stop sleeves 102 and 104 located respectively above and below the collar 100 so that endwise movement of the control bar 88 causes a corresponding movement of the clutch control lever 38.

The downward movement of the control rod 88 in starting the machine, acts through the rotation of the lever arm 90 about its pivot to retract the lock bolt 65 out of engagement with the bell-crank lever 59, and through the engagement of the pin 94 with the arm 98 to raise the crank pin 79 and release the brake. At the same time the main clutch control lever 38 is moved about its pivot by the engagement therewith of the collar 102 to close the main clutch and start the machine. Conversely, the upward movement of the control rod 88 acts to release the main driving clutch 38, raises the lock bolt into the path of the bell-crank 59 for controlling the operation of the auxiliary clutch, and moves the crank pin 79 about its pivot to bring the brake band 80 into operative position.

With the present construction the control rod 88 is actuated from the starting treadle of the machine by means of a treadle rod 106 which is provided at its upper end with a hook 108 arranged to engage with a corresponding ledge 110 formed on the control rod 88. A compression spring 112 seated at one end on a platform 114 on the machine frame and at its other end bearing against the lower end of the control rod 88, tends to maintain the control rod in a raised position with the ledge 110 in engagement with the hook 108. The treadle rod 106 and the control rod 88 are supported to maintain their positions with relation to each other by means of a bracket 116 secured by a bolt 118 to a fixed portion of the machine. The control rod 88 is supported for vertical sliding movements in a bearing 120 formed in the bracket 116. The treadle rod 106 is supported for vertical movements and also for movements laterally toward and away from the control rod 88 in a vertical slot 122 formed in the end of the bracket 116. A tension spring 124 connected at one end to the treadle rod 106 and at its other end to a fixed portion of the machine tends to hold the treadle rod to the right as shown in Fig. 2 in close proximity to the control rod 88.

In carrying out the several features of the present invention, the machine illustrated in the drawings is provided with two shoe contact members 126 and 128 which are located at equal distances to each side of the sewing mechanism including the needle 10, and are supported respectively on the downwardly extending arms of two bell-crank shaped shoe contact levers 130 and 132 which are secured to pivot shafts 134 and 136 on the machine frame, and are connected to move together by the engagement of two gear segments 138 formed respectively on the laterally extending arms of the bell-cranks 130 and 132. A spring 140 coiled about the pivot shaft 136 and secured at one end to the shaft and at its other end to the machine frame tends at all times to hold the levers and contact members 126 and 128 at their limiting positions towards the needle.

Each of the shoe contact plates 126 and 128 has formed thereon lugs 141 perforated to receive a vertical post 142 which at its upper end engages in a recess formed in the downwardly extending arm of the corresponding bell-crank lever 130 or 132. Set screws 144 hold the posts 142 rigidly in position on the levers 130 and 132, and set screws 146 are provided to clamp the shoe contact members 126 and 128 rigidly in adjusted position on the posts 142. The shoe contact member 128 on the left side of the machine as seen in Fig. 1 comprises a flat plate which is set in a vertical position at right angles to and somewhat above the shoe sole when placed in a substantially horizontal position in the machine. The shoe contact member 126 similarly comprises a flat plate set at right angles to and slightly above the point of operation at the right side of the machine as seen in Fig. 1. The forward edge of the plate or member 126 is further provided with a bent portion 150 along its front edge as best seen in Fig. 19 to provide a cam surface for a purpose hereinafter to be described.

At the start of an operation on a shoe, the shoe contact plates 126 and 128 and their supporting levers 130 and 132 are adjustably positioned in accordance with the size of the shoe placed in the machine by engagement of the toe of the shoe with one of the plates 126, 128, and are held in this position during the operation by means of a mechanism which is actuated by contact of the shoe with one of these plates at the end of the operation to throw into operation the stopping mechanism of the machine. The mechanism for maintaining the shoe contact plates 126 and 128 in their adjusted position, and for throwing the stop motion of the machine into operation, comprises a downwardly extending arm 152 which is secured to the rear end of the pivot shaft 136, and at its lower end is provided with a U-shaped support 154 and a pin 156 on which are carried two pawls 158 slightly out of line with each other. Cooperating with the pawls 158 is a rack 160 which is slidably mounted in a fixed bracket 162, and extends through the aperture formed by the U-shaped support 154. At one end the rack 160 is arranged to slide in the forked end 164 of the fixed bracket 116, and is perforated to receive the lengthwise movable foot treadle rod 106. With this construction of the parts, it will be seen that a movement of the rack 160 to the left as shown in Fig. 2, will cause the upper end of the treadle rod 106 to be moved to the left against the pressure of its spring, disengaging the latch 108 from the projection 110 to release the stop control rod 88 and stop the machine.

The pawls 158 are disengaged from the rack 160 when a new shoe is placed in the machine, to permit an adjustment of the arm 152 and shoe contact members 126 and 128 with relation to the rack 160, and are then released to engage with the rack and maintain these parts in their adjusted position during the operation around the shoe by means of mechanism comprising a vertically movable pawl release member 168 which is arranged to engage with an upwardly extending nub 170 on each of the pawls 158. A small spring 172 tends to rotate each of the pawls 158 about its pivot into engagement with the rack 160. The pawl release member 168 is mounted on the lower end of a vertical rack 174 mounted to slide in a fixed bracket 176, and arranged to engage with a pinion 178 which in turn engages with a horizontally movable rack 180 mounted to slide in the bracket 176. A compression spring 182 inserted between a collar 184 on the upper end of the rack 174 and an offset portion 186 of the bracket 176, tends to maintain the rack 174 and the pawl release member 168 in their limiting low position with the collar 184 in engagement with the bracket 176 and with the pawls disengaged. The rack 180 is forked at one end, one member of the fork passing to each side of the treadle rod 106 and the control rod 88, and carries a pin 188 mounted between the arms of the fork to engage with an inclined cam surface 190 on the control rod 88, and with a correspondingly shaped surface 192 on the treadle rod 106. When the treadle rod 106 is depressed to start the machine after the shoe contact members 126 and 128 have been adjusted by contact of the toe of the shoe with one of these members, the corresponding downward movement of the control rod 88 through the engagement of the came surface 190 with the pin 188, causes the rack 180 to be moved to the left, as shown in Figs. 2 and 5, to raise the pawl control member 168, allowing the pawls 158 to move into locking engagement with the rack 160, so that the shoe contact members 126 and 128 are held in their adjusted position. At the end of the sewing operation, the toe of the shoe will again engage with one of the shoe contact members 126 or 128, causing the shoe contact levers 130 and 132 to be moved outwardly, and through the engagement of the pawls 158 with the rack 160, causing the rack 160 and treadle bar 106 to be moved to the left as illustrated in Figs. 2 and 5 to release the stop rod 88 and stop the machine.

The operation of the machine in sewing shoes is illustrated in a somewhat diagrammatic fashion in Figs. 6 to 19 inclusive of the drawings.

Figs. 6 to 9 illustrate the manner in which the shoe is manipulated in the hands of the operator during a sewing operation to sew a welt from the breast line of the heel around the toe to the breast line of the heel on the other side of the shoe, and applies equally to a left or a right shoe. It will be noted from a consideration of these views that the shoe contact members 126 and 128 are positioned above the plane of operation on the shoe while the shoe is in its normal operating position during the sewing operation. It is usual for the operator in sewing a welt shoe when starting the operation to place the shoe in the machine with the toe in an elevated position for the formation of the first stitch. With the shoe in this position as illustrated in Fig. 6, the toe is elevated into line with the shoe contact member 126 and engages therewith, so that the contact members 126 and 128 are positioned in accordance with the length of shoe being operated upon. The operator now depresses the foot treadle to start the machine, causing the shoe contact members 126 and 128 to be locked in their adjusted position as above described. As the operation on the shoe progresses along the shoe sole, the shoe is returned by the operator to a substantially level position. Figs. 7 and 8 illustrate two positions of the shoe immediately before and after the operation has progressed around the toe of the shoe. As the point of operation approaches the breast line of the heel on the opposite side of the shoe from the starting position, the toe of the shoe is again elevated by the operator into line with the shoe contact member 128, so that continued feeding of the shoe past the shoe operating devices causes the toe of the shoe to engage with the contact member 128 and move it to the left as shown in Fig. 9, causing the stop motion to be thrown into operation to stop the machine as above described.

Figs. 10 to 14 inclusive illustrate the operation of the machine in sewing a welt completely around the shoe sole of a right shoe. As shown in Fig. 10 of the drawings, the shoe is placed in the machine with the toe to the left to start the operation at the inside breast line of the heel. The toe is elevated by the operator in placing the shoe in the machine, so that the toe engages with the shoe contact member 128 which is locked in position upon depressing the foot treadle as above described. As the sewing operation starts, the toe is immediately depressed to a substantially level position below the plane of the contact member 128 as shown in Fig. 11, so that as the shoe is fed to the left, the toe passes beneath the contact member 128. Figs. 12 and 13 illustrate different positions of the shoe as the sewing operation progresses around the shoe sole. As the sewing operation nears completion, the toe is again elevated by the operator into engagement with the contact member 128 which is moved to the left to throw the stop motion of the machine into operation as above described.

Figs. 15 to 19 inclusive illustrate the operation of the machine in sewing a welt completely around the shoe sole of a left shoe. As shown in Fig. 15 of the drawings, the shoe is placed in the machine with the toe to the right to start the operation at the inside breast line of the heel. The toe is elevated by the operator in placing the shoe in the machine, so that the toe engages with the shoe contact member 126 which is locked in position upon depressing the foot treadle as above described. Upon starting the operation, the shoe is immediately returned to its substantially level position below the plane of the contact members 126 and 128. Figs. 16 and 17 illustrate different positions of the shoe during the progress of the sewing operation about the shoe sole. As the operation again approaches the breast line of the heel, the toe of the shoe is again elevated by the operator, and is moved inwardly, so that the toe engages with the cam surface 150 of the contact member 126, causing this member to be moved outwardly as shown in Figs. 18 and 19 to throw the stop motion of the machine into operation.

The nature and scope of the invention having been indicated and an embodiment of the several features of the invention having been specifically described, what is claimed is:

1. A machine adapted for use in the manufacture of shoes having, in combination, shoe feeding and operating devices for performing an operation progressively about the bottom margin of a shoe, an auxiliary mechanism arranged to operate upon completion of the operation upon the shoe, and a shoe contact member extending into a position to be engaged by the shoe at the end of the operation and during the continued operation of said feeding and operating devices to throw said auxiliary mechanism into operation.

2. A machine adapted for use in the manufacture of shoes having, in combination, shoe feeding and operating devices for performing an operation progressively about the bottom margin of a shoe, an auxiliary mechanism arranged to operate at the completion of the operation about the shoe, a shoe contact member extending into a position to be engaged by the shoe at the end of the operation about the shoe and during the continued operation of said feeding and operating devices, and connections rendered operative by the displacement of said contact member to throw said auxiliary mechanism into operation.

3. A machine adapted for use in the manufacture of shoes having, in combination, shoe feeding and operating devices for performing an operation progressively about the bottom margin of a shoe, an auxiliary mechanism arranged to operate at the completion of the operation about the shoe, a shoe contact member automatically positioned upon placing a shoe in the machine to contact with the shoe at the end of the operation about the shoe during the continued operation of said feeding and operating devices, and connections rendered operative by the displacement of said contact member upon contact with the shoe to throw said auxiliary mechanism into operation.

4. A machine adapted for use in the manufacture of shoes having, in combination, shoe feeding and operating devices for performing an operation progressively about the bottom margin of a shoe, auxiliary mechanism arranged to operate at the end of the operation on a shoe, shoe contact devices adjustably positioned by contact with a shoe when placed in the machine, means for maintaining said devices in their adjusted position during the operation about the shoe, and connections rendered operative by the engagement of the shoe with said contact devices at the end of the operation on the shoe to throw said auxiliary mechanism into operation.

5. A machine adapted for use in the manufacture of shoes having, in combination, shoe feeding and operating devices for performing an operation progressively about the bottom margin of a shoe, a shoe contact member arranged to engage with the shoe during the operation of said feeding and operating devices, means for adjusting the position of said member for operation with shoes of different sizes, and an auxiliary mechanism thrown into operation by said contact member when engaged by the shoe.

6. A machine adapted for use in the manufacture of shoes having, in combination, mechanism for operating upon a shoe, stopping mechanism for the machine, and a member displaced by contact with the shoe at the end of said operation to render said stopping mechanism operative to stop the machine.

7. A machine adapted for use in the manufacture of shoes having, in combination, mechanism for operating upon a shoe, stopping mechanism for the machine, a member displaced by contact with the shoe at the end of said operation to render said stopping mechanism operative to stop the machine, and means for adjusting the position of said member for operation with shoes of different sizes.

8. A machine adapted for use in the manufacture of shoes having, in combination, mechanism for operating upon a shoe while held in the hands of an operator, a shoe contact lever with relation to which the shoe is moved during the operation thereon arranged to be displaced by the shoe at the end of said operation on the shoe, and means controlled by the lever for stopping the machine.

9. A machine adapted for use in the manufacture of shoes having, in combination, mechanism for operating upon a shoe while held in the hands of an operator, stopping mechanism for the machine, a shoe contact member with relation to which the shoe is moved during the operation thereon arranged to be displaced by placing the shoe in the machine, means for maintaining the member in adjusted position during the operation on the shoe, and means rendered operative by the engagement of the shoe with said member at the end of the operation on the shoe to stop the machine.

10. A machine adapted for use in the manufacture of shoes having, in combination, mechanism for operating upon a shoe while held in the hands of an operator, stopping mechanism for the machine, a shoe contact lever, means for adjusting the position of said lever for operation with shoes of different sizes, and means rendered operative by the engagement of the shoe with said lever in its adjusted position at the end of an operation on the shoe to render said stopping mechanism operative to stop the machine.

11. A machine adapted for use in the manufacture of shoes having, in combination, mechanism for operating upon a shoe while held in the hands of an operator, stopping mechanism for the machine, two shoe contact members positioned one at each side of the point of operation, connections between said levers arranged to maintain said levers at equal distances from the point of operation while permitting movement of said levers simultaneously toward and away therefrom, means for maintaining said levers in a position adjustably determined by engagement of one of said levers with the shoe upon placing the shoe in the machine, and means rendered operative by the engagement of the shoe with the other of said levers at the end of the operation on the shoe to render said stopping mechanism operative to stop the machine.

12. A machine adapted for use in the manufacture of shoes having, in combination, mechanism for operating upon a shoe, a pair of shoe contact levers positioned at opposite sides of the point of operation arranged for movement toward and away from the point of operation on opposite sides of and at equal distances therefrom, means for maintaining said levers in the adjusted position determined by engagement of the toe of the shoe with one of said levers upon placing the shoe in the machine, and mechanism rendered operative by the engagement of the other of said levers with the toe of the shoe at the end of the operation to stop the machine.

13. A machine adapted for use in the manufacture of shoes having, in combination, shoe feeding and operating devices for performing an operation progressively about the bottom margin of a shoe, a stop mechanism for the machine, shoe contact devices adjustably positioned by contact with a shoe when placed in the machine, a rack, a pawl cooperating with the rack and arranged to move with said shoe contact devices, mechanism rendered operative upon starting the machine to permit the engagement of the pawl with the rack to maintain the shoe contact devices in adjusted position, and connections from said rack actuated by movement of the rack with the pawl upon displacement of the shoe contact devices by contact with the shoe at the end of the operation upon the shoe to throw the stop mechanism into operation.

14. A machine adapted for use in the manufacture of shoes having, in combination, shoe feeding and operating devices for performing an operation progressively about the bottom margin of a shoe, a stopping mechanism for the machine, a shoe contact device adjustably positioned by contact with a shoe when placed in the machine, a starting treadle for the machine, connections rendered operative by the depression of the treadle in starting the machine to lock said shoe contact device in adjusted position, and connections rendered operative by contact of said shoe contact device with the shoe at the end of the operation to throw said stopping mechanism of the machine into operation.

15. A machine adapted for use in the manufacture of shoes having, in combination, mechanism for operating upon a shoe, a stopping mechanism for the machine, two shoe contact members, connections between said members whereby contact of one of said members with the shoe when placed in the machine will adjust the position of the other of said members, and means rendered operative by the engagement of the shoe with the other of said members at the end of the operation on the shoe to render said stopping mechanism operative to stop the machine.

16. A machine adapted for use in the manufacture of shoes having, in combination, mechanism for operating upon a shoe, stopping mechanism for the machine, a shoe contacting device with relation to which the shoe is moved during the operation thereon arranged to be displaced by placing the shoe in the machine, and means rendered operative by the engagement of the shoe with said contacting device at the end of the operation on the shoe to throw said stopping mechanism into operation to stop the machine.

17. A machine adapted for use in the manufacture of shoes having, in combination, mechanism for operating upon a shoe, stopping mechanism for the machine, a shoe contacting device with relation to which the shoe is moved during the operation thereon arranged to be displaced by placing the shoe in the machine, means for maintaining said device in adjusted position during the operation on the shoe, and means rendered operative by the engagement of the shoe with said device at the end of the operation on the shoe to throw said stopping mechanism into operation to stop the machine.

18. A machine adapted for use in the manufacture of shoes having, in combination, shoe feeding and operating devices for performing an operation progressively about the bottom margin of a shoe, a stopping mechanism for the machine, a shoe contacting device comprising two shoe contact members located on opposite sides of the point of operation on the shoe, means for adjusting said members in a direction substantially perpendicular to the plane of the shoe sole to maintain said members out of the path of the shoe during the operation on the shoe, connections between said members whereby contact on one of said members with the toe of the shoe when placed in the machine will adjust the position of both of said members, and means rendered operative by the engagement of the shoe with one of said members at the end of the operation on the shoe to render said stopping mechanism operative to stop the machine.

19. A machine adapted for use in the manufacture of shoes having, in combination, mechanism for operating upon a shoe, stopping mechanism for the machine, a shoe contacting device comprising two shoe contact members located on opposite sides of the point of operation, connections between said members whereby contact of one of said members with the shoe when placed in the machine will adjust the position of both of said members, and means rendered operative by the engagement of the shoe with one of said members at the end of the operation on the shoe to render said starting mechanism operative to stop the machine.

20. A machine adapted for use in the manufacture of shoes having, in combination, shoe feeding and operating mechanism for performing an operation progressively upon the bottom margin of a shoe, a shoe contacting device comprising two shoe contact members located one at each side of the point of operation on the shoe and with relation to which the shoe is moved during the operation thereon, said members being arranged to be displaced by placing the shoe in the machine and out of the path of movement of the shoe during the progress of the point of operation about the shoe, and means rendered operative by the engagement of the shoe with one of said members at the end of the operation on the shoe to stop the machine.

21. A machine adapted for use in the manufacture of shoes having, in combination, shoe feeding and operating devices for performing an operation progressively about the bottom margin of a shoe, a stopping mechanism for the machine, a shoe contact member having a shoe engaging surface substantially perpendicular to the plane of the shoe sole, and at an angle to the direction of feed, said member being arranged to be displaced by placing the shoe in the machine, means for maintaining the member in adjusted position during the operation on the shoe, and means rendered operative by movement of the toe of the shoe into engagement with said shoe contact member at the end of the operation on the shoe to stop the machine.

ALFRED R. MORRILL.